United States Patent
Dozono et al.

(10) Patent No.: US 6,697,682 B2
(45) Date of Patent: Feb. 24, 2004

(54) ADAPTIVE CONTROL APPARATUS AND SHAKING TABLE

(75) Inventors: Yoshihiro Dozono, Chiyoda (JP); Toshihiko Horiuchi, Ushiku (JP); Takao Konno, Minori (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 09/929,129

(22) Filed: Aug. 15, 2001

(65) Prior Publication Data

US 2002/0128732 A1 Sep. 12, 2002

(30) Foreign Application Priority Data

Jan. 26, 2001 (JP) .................................... 2001-018590

(51) Int. Cl.$^7$ ............................................. G05B 13/02
(52) U.S. Cl. ........................ 700/55; 700/280; 700/32; 74/664
(58) Field of Search ............................ 700/55, 54, 60, 700/56, 31, 37, 71, 29, 32, 280; 74/664, 663

(56) References Cited

U.S. PATENT DOCUMENTS

| | | | | |
|---|---|---|---|---|
| 3,803,906 A | * | 4/1974 | Ross ......................... | 73/664 |
| 4,297,888 A | * | 11/1981 | Hirai et al. ................. | 73/664 |
| 4,537,077 A | * | 8/1985 | Clark et al. ................. | 73/665 |
| 4,991,107 A | * | 2/1991 | Sloane ....................... | 700/280 |
| 5,060,519 A | * | 10/1991 | Chojitani et al. ............ | 73/664 |
| 5,179,516 A | * | 1/1993 | Choshitani et al. .......... | 700/56 |
| 5,182,887 A | * | 2/1993 | Uno et al. .................. | 52/167.1 |
| 5,388,056 A | * | 2/1995 | Horiuchi et al. ............. | 700/30 |
| 5,422,834 A | * | 6/1995 | Horiuchi et al. ............. | 703/7 |
| 5,737,239 A | * | 4/1998 | Horiuchi et al. ............. | 73/663 |
| 6,189,385 B1 | * | 2/2001 | Horiuchi et al. ............. | 73/664 |

OTHER PUBLICATIONS

"Control of Electro–hydraulic Shaking Tables", Ide et al, The Japan Society of Mechanical Engineers, Dynamics and Design Conference 1999, Proceeding vol. B, pp. 15–18.*

"Advanced Control of Three–dimensional Shaking Table", Maekawa et al., 1st Symposium on the Improvement of Seismic Disasters Based on the Structure Crash Process Analysis, Proceeding (Mar. 2000), pp. 51–54.*

* cited by examiner

Primary Examiner—Ramesh Patel
Assistant Examiner—Edward F Gain
(74) Attorney, Agent, or Firm—Antonelli, Terry, Stout & Kraus, LLP

(57) ABSTRACT

A shaking table having: a feedback controller for generating a drive signal for actuators so that an inputted second command signal is agreed with a response signal indicating a vibration state of the table; an adaptive filter having variable filter coefficients which is supplied with an external first command signal indicating a target value of the response signal and generates the second command signal by compensating the transfer characteristics from the feedback controller to the table loading the specimen; a mask signal generator; a first adder for adding the mask signal to the second command signal; a second adder for adding the mask signal to the response signal; and an identification unit which is supplied with the outputs of the first and the second adders, for calculating the filter coefficients of the adaptive filter to compensate the transfer characteristics, and supplying the calculated coefficients to the adaptive filter.

9 Claims, 5 Drawing Sheets

ADAPTIVE CONTROL APPARATUS AND SHAKING TABLE

BACKGROUND OF THE INVENTION

The present invention relates to an adaptive control device and a shaking table and in particular to an adaptive control device for controlling the shaking table system so that a response from a process to be controlled is matched with a target and to a shaking table using the device.

The adaptive control is a control method for adaptively changing a control parameters in real time so as to achieve a desired input-output characteristics even when dynamic characteristics of the process to be controlled are changed by operating conditions and an environment. As such a control method, there is a method which identifies the process to be controlled in real time and the identification result is used to determine control coefficients of an adaptive filter so as to modify an input signal to the process to be controlled in real time or a method which creates a filter in real time to agree a response signal from the process to be controlled with a desired response signal, so that an adaptive filter having the same characteristics as this filter is used for real-time modification of an input signal to the process to be controlled. These control methods have been used mostly for control process having a large time constant such as a liquid or a flow rate control in chemical plants.

There are also attempts to use these methods for compensating the transfer characteristic fluctuation of a shaking table on which an object to be tested is loaded (for example, Ide et al "Control of Electro-hydraulic Shaking Tables" The Japan Society of Mechanical Engineers, Dynamics and Design Conference 1999, Proceeding Vol. B (1999), pp. 15–18, and Maekawa et al "Advanced Control of Three-dimensional Shaking Table, $1^{st}$ Symposium on the Improvement of seismic disasters based on the structure crash process analysis, Proceeding (2000-3), pp. 51–54). Here, the shaking table is one of the seismic test devices. FIG. 2 shows a configuration example thereof. In FIG. 2, a table 6 is supported on a basement 121 via a bearing 120. The bearing is not necessarily required depending on the configuration of the shaking table. The table 6 is connected to an actuator 5 mounted on the basement 121. Moreover, shaking table state measurement means 122 is set on the table 6. The actuator 5 is controlled by a feedback controller 4 using as feedback signals shaking table state variables measured by the shaking table state measurement means 122. A specimen 3 loaded on the table 6 is excited, for example, by seismic acceleration, so that its behavior is observed and structual reliability is evaluated. In case of a shaking table control, the upper limit of the control frequency range is, for example, 50 Hz or above. That is, the time constant is small as compared with chemical plants.

FIG. 3 is a block diagram of an example of the shaking table control system using an adaptive control. A controlled object 1 includes a shaking table 2 and a specimen 3. The shaking table 2 includes a feedback controller 4, an actuator 5, and a table 6. Identification means 15 includes a digital filter 10, a subtractor 16, and adaptive means 14. A command signal 101 generated by a signal generator 7 is modified into a modified command signal 102 by an adaptive filter 8 and fed to the feedback controller 4. The feedback controller performs PID compensation and feedback compensation and generates a drive signal 103. The drive signal 103 is fed to the actuator 5 so as to excite the table 6 and the specimen 3 loaded on this table. Here, a reaction force from the specimen 3 is added to the table and as a result, the shaking table transfer characteristics fluctuate. To solve this problem, the subtractor 16 is used to determine an estimated error 108 of a signal 107 obtained by supplying an actual shaking table response signal 106 to the digital filter 10 against a desired shaking table response signal 105 obtained by supplying the modified command signal 102 to a reference signal generator 9. In order to minimize this error, the adaptive means 14 determines by control coefficient 109 of the digital filter 10 using, for example, the least mean square (LMS) method in real time, and the fluctuation of the shaking table transfer characteristic due to the specimen is compensated by matching the characteristics of the adaptive filter 8 to the characteristics of the digital filter 10.

In the aforementioned example of the shaking table control, it is known that when the order of the digital filter 10 is not sufficiently higher than the order of the adaptive filter 8 required for compensation, identification cannot be performed because of the effect of noise contained in the shaking table response signal 106 and the effect of the higher-order vibration mode of the specimen and the shaking table itself other than for the compensation. Therefore, it is necessary to determine a control coefficient for a higher-order digital filter 10, which requires a very long time such as 5 minutes for calculation. This causes a problem that the identification cannot be performed for an earthquake wave which lasts only for several seconds for several tens of seconds.

SUMMARY OF THE INVENTION

It is therefore an object of the present invention to provide an adaptive control apparatus capable of compensating only a desired frequency band and significantly reducing the time required for identifying a process to be controlled, and a shaking table capable of real-time compensation of the shaking table transfer characteristic fluctuation by a specimen or the like.

The present invention provides a shaking table including:

a table to load a specimen;

actuators to excite the table;

a feedback controller for generating a drive signal for the actuator so that an inputted second command signal is agreed with a response signal indicating a vibration state of the table having the same dimension as this second command signal;

an adaptive filter having variable filter coefficient which is supplied with an external first command signal indicating a target value of the response signal and generates the second command signal so as to compensate the transfer characteristics from the feedback controller to the table loading the specimen;

a mask signal generator for generating a mask signal having no frequency component in the frequency band compensated by the adaptive filter;

a first adder for adding the mark signal to the second command signal; and a second adder for adding the mask signal to the response signal;

an identification unit which is supplied with the outputs of the first and the second adders for calculating the filter coefficients of the adaptive filter for compensating the transfer characteristic and supplying the calculated coefficient to the adaptive filter.

Moreover, the present invention provides a shaking table includes:

a table for loading a specimen;

a actuator for actuating the table;

a feedback controller for generating a drive signal for the actuator so that an inputted second command signal is agreed with a response signal indicating a vibration state of the table having the same dimension as this second command signal;

an adaptive filter having variable filter coefficients which is supplied with an external first command signal indicating a target value of the response signal and generates the second command signal so as to compensate the transfer characteristics from the feedback controller to the table loading the specimen;

a mask signal generator for generating a mask signal having no frequency component in the frequency band to be compensated by the adaptive filter;

a reference signal generator which is supplied with the second command signal and calculates the target value of the response signal using a desired transfer characteristics or a transfer characteristics of a predetermined non-load state;

a first adder for adding the mask signal to an output signal from the reference signal generator; and a second adder for adding the mask signal to the response signal;

an identification unit which is supplied with the outputs of the first and the second adders, for calculating the filter coefficients of the adaptive filter to compensate the transfer characteristics and supplying the calculated coefficient to the adaptive filter.

Moreover, the shaking table includes first and second bandpass filters having the same characteristics whose pass band is the same range as the compensated frequency range wherein the second command signal or the reference signal generator output is filtered by the first bandpass filter and then is added to the mask signal by the first adder, while the response signal is filtered by the second bandpass filter and is added to the mask signal by the second adder.

Moreover, in the aforementioned shaking table, the mask signal generator has a white noise generator and a bandstop filter for preventing the frequency band to be compensated by the adaptive filter.

According to another aspect of the present invention, there is provided an adaptive control device for controlling so that control state variables of a process to be controlled are agreed with a target signal, the device including:

an adaptive filter having variable filter coefficients which is supplied with the target signal and generating the control input signal, so as to compensate the transfer characteristics from the control input signal to the control state variable of the process to be controlled;

a signal generator for generating a mask signal having no frequency component in the frequency band compensated by the adaptive filter;

a first bandpass filter whose pass band is the same as the frequency band compensated by the adaptive filter and which is supplied with the control input signal;

a first adder for adding the mask signal to the output from the first bandpass filter;

a second bandpass filter having the same characteristics as the first bandpass filter, which is supplied with a control state variable calculated by a measurement unit;

a second adder for adding the mask signal to the output from the second bandpass filter; and an identification unit which is supplied with the outputs of the first and second adders for calculating filter coefficients of the adaptive filter to compensate the transfer characteristics and supplying the calculated coefficients to the adaptive filter.

DETAILED DESCRIPTION OF THE EMBODIMENTS

Figure 1:
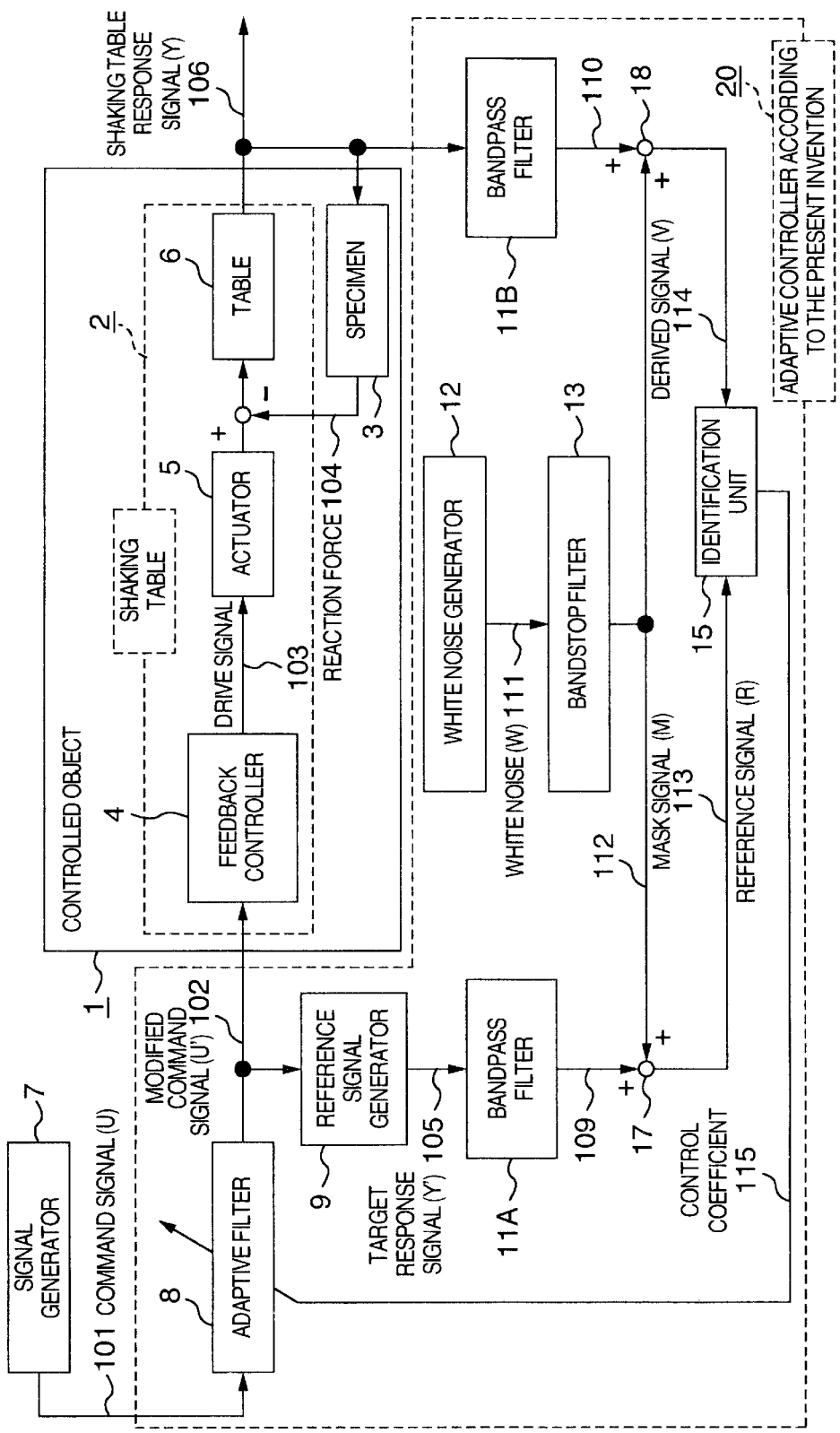
FIG. 1 shows a control block diagram of a shaking table having an adaptive controller according to the present invention.
Figure 2:
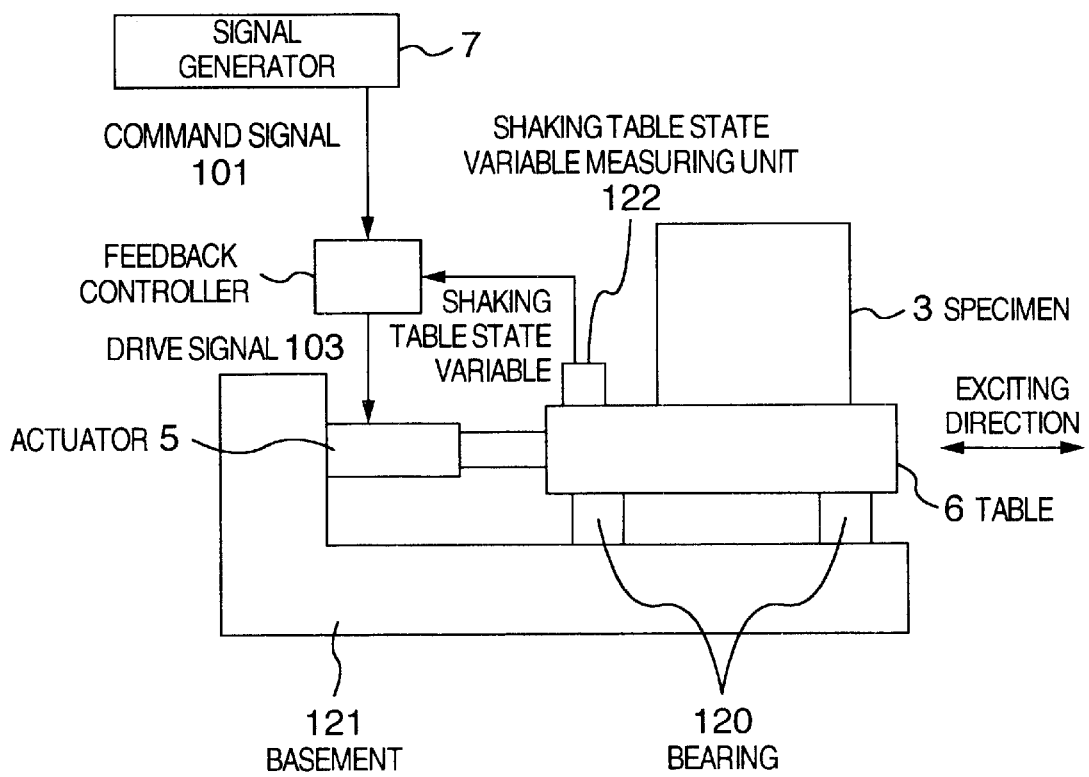
FIG. 2 shows configuration of the shaking table.
Figure 3:
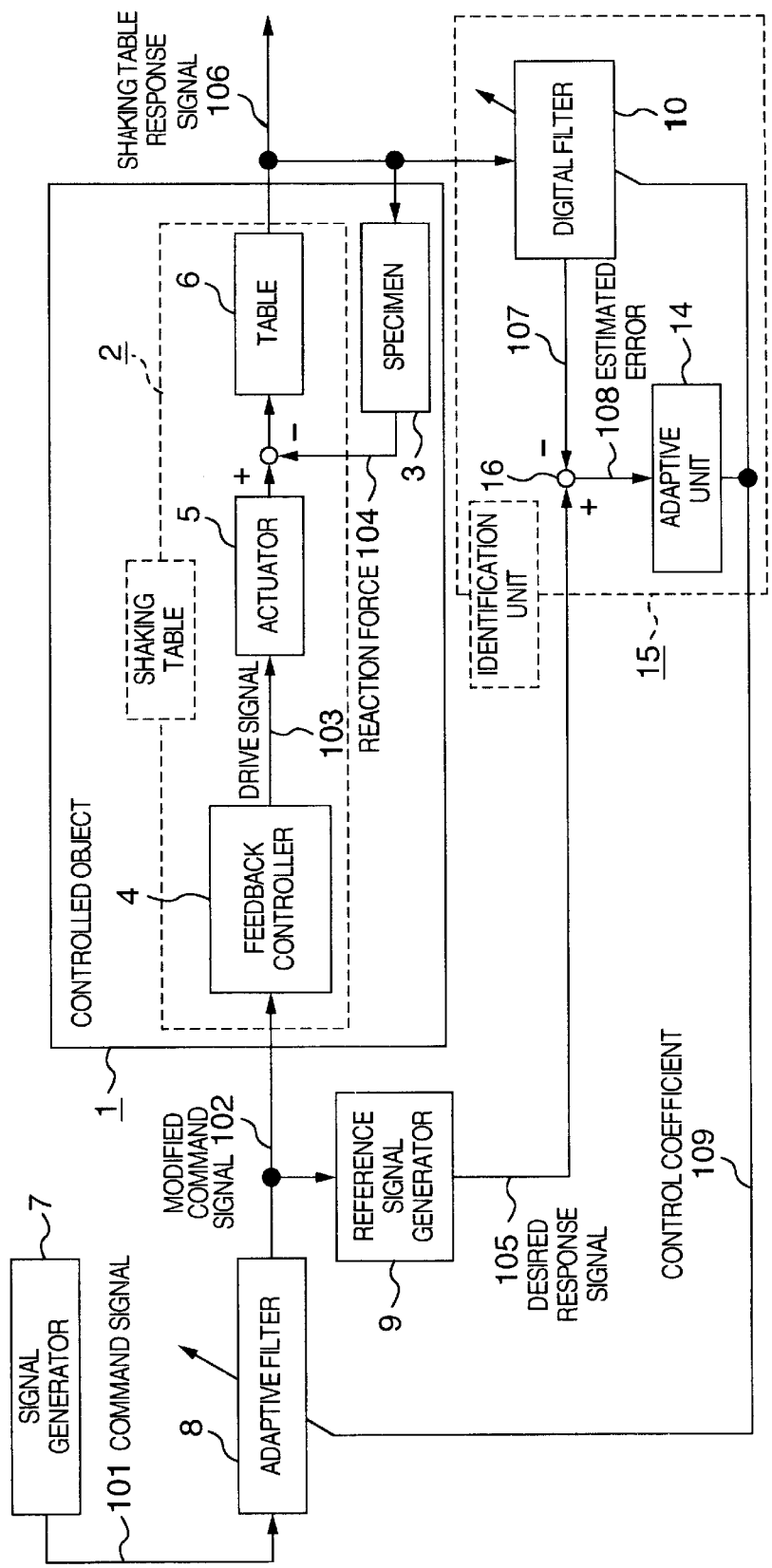
FIG. 3 shows an example of shaking table control block diagram using a conventional adaptive controller.

Description will now be directed to preferred embodiments of the present invention. FIG. 1 is a block diagram of a shaking table having an adaptive controller according to the present invention. In FIG. 1, a controlled object 1 and a signal generator 7 are identical to those in FIG. 3. The adaptive controller 20 according to the present invention includes bandpass filters 11A and 11B, a white noise generator 12, a bandstop filter 13, and adders 17 and 18 in addition to the reference signal generator 9 and the identification unit 15 as in FIG. 3. A target signal 101 from the signal generator 7 is fed to the adaptive filter 8 and modified into a modified command signal 102. The modified command signal 102 is fed to the controlled object 1 and to the reference signal generator 9. The reference signal generator 9 uses this modified command signal 102 to calculate a desired shaking table response signal (desired response signal) 105. By using this desired response signal 105, it is possible to compensate a response delay of and gain drop of the controlled object 1 in a higher frequency region so as to prevent to generate of an adaptive filter having an unstable characteristics. It should be noted that when the controlled object 1 can sufficiently respond to the target signal 101 and the aforementioned phenomenon is not to be seen, the reference signal generator 9 does not necessarily have to be provided.

Figure 4:
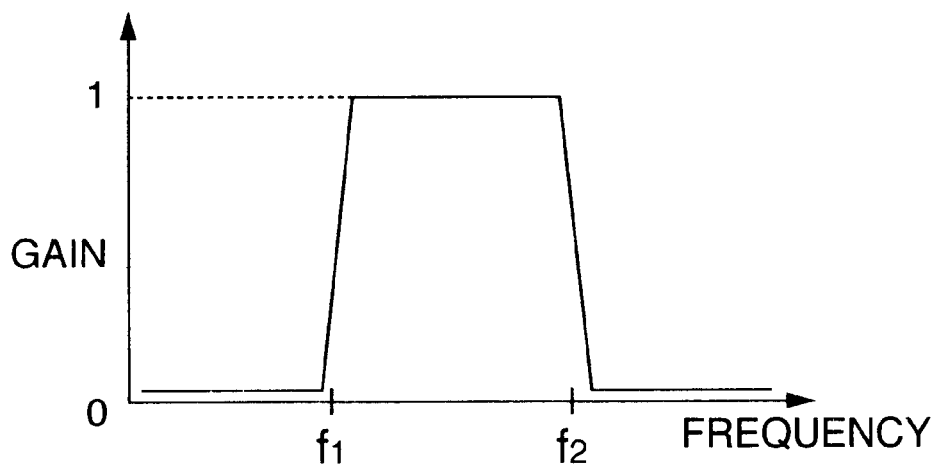
FIG. 4 shows an example of frequency characteristics of bandpass filters.

Next, the desired response signal 105 and the actual shaking table response signal 106 are fed to the bandpass filters 11A and 11B having the same characteristics, for example, as shown in FIG. 4 and become signals 109 and 110, respectively. By using these bandpass filters, it is possible to eliminate noise and DC component contained in the desired response signal 105 and the actual shaking table response signal 106 and extract a target frequency component. As a result, it is possible to make the characteristics of the adaptive filter stable. Furthermore, it becomes possible to identify with an identification model of a lower order, therefore to reduce the identification calculation time. It should be noted that when the noise and DC component contained in these signals are sufficiently small, the bandpass filters 11A and 11B do not necessarily have to be provided.

Figure 5:
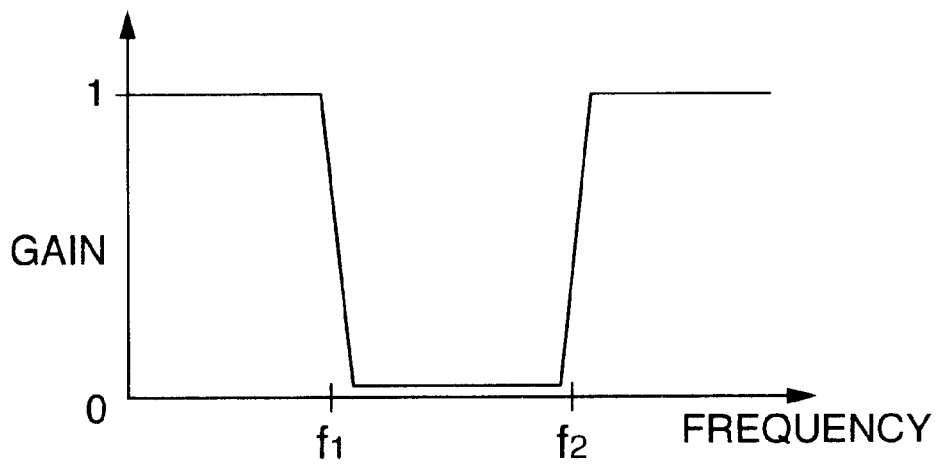
FIG. 5 shows an example of frequency characteristics of a bandstop filter.

Furthermore, the white noise 111 generated by the white noise generator 12 is applied to the bandstop filter 13 having characteristics, for example, as shown in FIG. 5 to generate a mask signal 112. The mask signal 112 is added to the signals 109 and 110 by the adders 17 and 18 so as to generate a reference signal 113 and a desired signal 114. Thus, in the all frequency components except the compensated frequency range (mask band), the mask signal 112 occupies a dominant component of the reference signal 113 and the derived signal 114 so that in the mask band, the reference signal 113 appears to be agreed with the derived signal 114. That is, it is possible to obtain a difference between the reference signal 113 and the derived signal 114 only in the frequency band to be compensated without being affected by a higher-order vibration mode of the shaking table itself and the specimen other than the compensation. Furthermore, in general, because the SN ratio of the actual shaking table response signal 106 is large in the frequency band to be compensated, the noise contained in the shaking table response signal 106 almost does not affect. Therefore, it is possible to compensate only in a target frequency band and make the characteristics of the adaptive filter stable. Furthermore, identification is possible with an identification model of a lower order, which reduces the identification calculation time. Here, it is preferable that the pass band of the bandpass filter is identical with the stop band of the bandstop filter, because it enhances the effects of the bandpass filters and the mask signal. Based on the reference signal 113 and the derived signal 114, the identification unit 15 successively identifies a difference between the transfer characteristics of the controlled object and those of the reference signal generator 9, which are the desired shaking table transfer characteristics, in the frequency band passed by the bandpass filter, for example, by using the recursive least square method. Control coefficients of the adaptive filter 115 are determined so that the characteristics of the adaptive filter 8 are an inverse transfer characteristics of the difference between the two transfer characteristics.

Thus, by using the reference signal generator 9, the bandpass filters 11A and 11B, and the mask signal 112, it is possible to extract the difference between the desired and the actual shaking table transfer characteristics appearing in the pass band of the bandpass filters, it is also possible to suppress the effect of the difference between the desired and the actual shaking table transfer characteristics appearing in the pass band of the bandstop filter 13 and the effect of noise contained in the shaking table response signal 106. Therefore, it is possible to compensate in a desired frequency band and to make the characteristics of the adaptive filter stable. Furthermore, it is possible to identify with an identification model of a lower order and reduce the identification calculation time.

Next, a detailed explanation will be given on operation of respective components of the adaptive controller 20 in FIG. 1 using mathematical equations. The adaptive filter 8 compensates the fluctuation of the shaking table transfer characteristics due to loading a specimen and has a function as follows. Upon reception of a command signal 101 (expressed by a variable U[k] wherein k represents a sampling count) from the signal generator 7, the adaptive filter 8 generates a modified command signal 102 (expressed by a variable U'[k]) according to Equation (1) assuming the control coefficients 115 indicated by the identification unit 15 to be $a_i$, $b_j$ (wherein i=1, ..., n and j=0, ..., m).

$$U'[k]=b_0U[k]+b_1U[k-1]+\ldots+b_mU[k-m]-a_1U'[k-1]-\ldots-a_nU'[k-n] \quad (1)$$

The initial values of the control coefficient are as follows: $b_0=1$, $a_i$, $b_i=0$ (i=1, ..., n). The modified command signal U'[k] generated is fed to the feedback controller 4 and the reference signal generator 9.

The reference signal generator 9 calculates a desired response signal 105 (expressed by Y'[k]) which should be realized by a shaking model having desired shaking table transfer characteristics or a shaking table transfer characteristics which are predetermined when the shaking table is non-load according to the modified command signal U'[k]. The reference signal generator 9 is realized, for example, as follows. For a desired shaking table model or a shaking table model of a predetermined non-load state, when the system matrix, the control matrix, the output matrix, and the transfer matrix are assumed to be $A_{ST}$, $B_{ST}$, $C_{ST}$, and $D_{ST}$, and the state variable vector is assumed to be $X_{ST}[k]$, the desired response signal Y'[k] can be obtained by Equation (2).

$$\begin{cases} X_{ST}[k] = A_{ST}X_{ST}[k] + B_{ST}U'[k] \\ Y[k] = C_{ST}X_{ST}[k] + D_{ST}U'[k] \end{cases} \quad (2)$$

The desired response signal Y'[k] thus calculated and the actual shaking table response signal 106 (Y[k]) are fed to the bandpass filters 11A and 11B, respectively. The bandpass filters 11A and 11B generate signal 109 and signal 110 (expressed by $R_0[k]$ and $V_0[k]$, respectively) by eliminating noise and a DC component contained in the desired response signal Y'[k] generated by the reference signal generator 9 and in the shaking table response signal Y[k]. These bandpass filters are realized as follows. For the bandpass filter when system matrix, control matrix, output matrix, and transfer matrix are assumed to be $A_{BP}$, $B_{BP}$, $C_{BP}$, and $D_{BP}$ and the state variable vectors are assumed to be $X_{BP_1}[k]$ and $X_{BP_2}[k]$, $R_0[k]$ and $V_0[k]$ are obtained from Equations (3) and (4), respectively.

$$\begin{cases} X_{BP1}[k] = A_{BP}X_{BP1}[k] + B_{BP}Y'[k] \\ R_0[k] = C_{BP}X_{BP1}[k] + D_{BP}Y'[k] \end{cases} \quad (3)$$

$$\begin{cases} X_{BP2}[k] = A_{BP}X_{BP2}[k] + B_{BP}Y[k] \\ V_0[k] = C_{BP}X_{BP2}[k] + D_{BP}Y[k] \end{cases} \quad (4)$$

On the other hand, the white noise 111 (expressed by W[k]) generated by the white noise generator 12 is fed to the bandstop filter 13, where particular frequency components are removed, so as to obtain a mask signal 112 (expressed by M[k]). The bandstop filter 13 is realized as follows, for example. For the bandstop filter, when the system matrix, control matrix, output matrix, and transfer matrix are assumed to be $A_{BS}$, $B_{BS}$, $C_{BS}$, and $D_{BS}$ and the state variable vector is assumed to be $X_{BS}[k]$, the mask signal M[k] can be obtained from Equation (5).

$$\begin{cases} X_{BS}[k] = A_{BS}X_{BS}[k] + B_{BS}W[k] \\ M[k] = C_{BS}X_{BS}[k] + D_{BS}W[k] \end{cases} \quad (5)$$

By adding a mask signal M[k] to the signals 109 ($R_0[k]$) and 110 ($V_0[k]$), they become a reference signal 113 (expressed by R[k]) and a derived signal 114 (expressed by V[k]), respectively. That is, the reference signal R[k] and the derived signal V[k] can be obtained from Equations (6) and (7), respectively.

$$R[k]=R_0[k]+M[k] \quad (6)$$

$$V[k]=V_0[k]+M[k] \quad (7)$$

The identification unit 15 compares the reference signal R[k] with the derived signal V[k], so as to successively identify a fluctuation of the actual shaking table transfer characteristics against the desired shaking table transfer characteristics or the shaking table transfer characteristics of a predetermined non-load state, and to generate a control coefficients to realize an inverse transfer characteristics of the identified fluctuation. For example, the identification unit is realized as follows. For the modified command signal U'[k], the reference signal R[k] is affected by the reference signal generator 9, the bandpass filter 11A, and the mask signal M[k]. On the other hand, the derived signal V[k] is affected by the controlled object 1, the bandpass filter 11B, and the mask signal M[k]. Therefore, when the reference signal R[k] is compared with the derived signal V[k], it is possible to obtain a difference between the transfer characteristics of the reference signal generator 9 and the controlled object 1, i.e., a difference between the desired shaking table transfer characteristics or the shaking table transfer characteristics of a predetermined non-load state and the transfer characteristics of the shaking table loading a specimen thereon. That is, it is possible to extract a fluctuation ΔJ of the shaking table transfer characteristics due to the specimen. One of the identification methods to identify this fluctuation ΔJ from the reference signal R[k] and the derived signal V[k] is the recursive least square method. In this recursive least square method, the latest reference signal R[k], the reference signal R[k−j] (wherein j=1, ..., m) for the past point m, and the derived signal V[k−i] (wherein i=1, ..., n) for the past point n are used to obtain an estimated value V'[k] of the latest derived signal using Equation (8).

$$V'[k]=a'_0R[k]+a'_1R[k-1]+\ldots a'_mR[k-m]-b'_1V[k-1]-\ldots -b'_nV[k-n] \qquad (8)$$

Then, coefficients $a'_j$ and $b'_j$ are calculated to minimize the error of the estimated value V'[k] of the derived signal against the actual derived signal V[k]. The coefficients $a'_j$ and $b'_i$ are parameters to express the identified fluctuation ΔJ. Therefore, control coefficients $a_i$ and $b_j$ to compensate the fluctuation ΔJ can be obtained by Equation (9) as follows.

$$a_j=a'_j/a'_0$$
$$b_i=b'_i/a'_0$$
$$b_0=1/a'_0 \qquad (9)$$

The control coefficients thus obtained are supplied to the adaptive filter 8 and the dynamic characteristics of the adaptive filter are modified to compensate the fluctuation ΔJ.

As is clear from the aforementioned detailed explanation on the adaptive controller 20 using Equations, when the larger one of the number of the reference signal R, m and the number of the output signal V, n is assumed to be an integer P=max (m, n), the white noise generator 12 need to repeatedly output only P data of white noise signal in synchronization with sampling.

Figure 6:
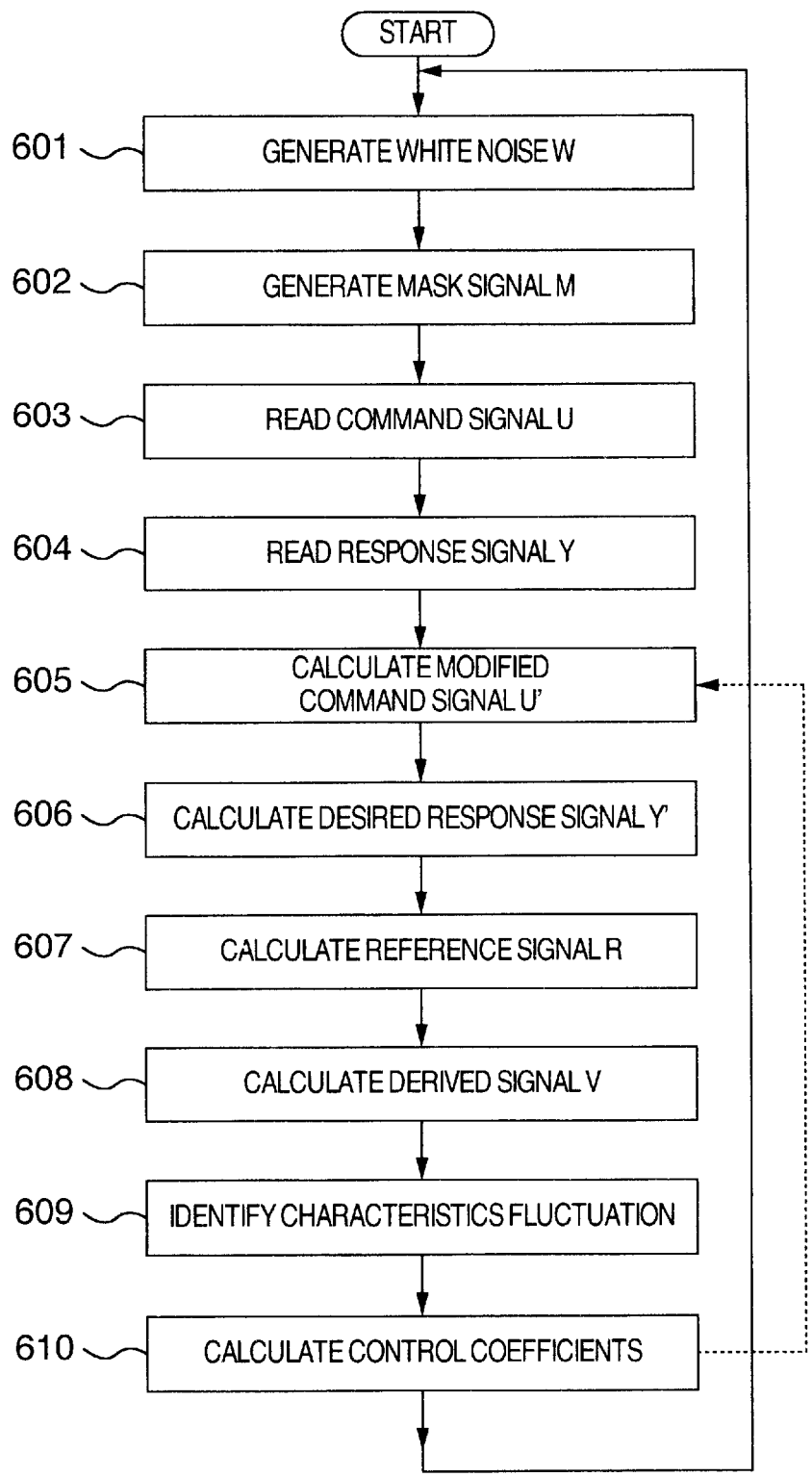
FIG. 6 shows an example of processing flow implemented in the adaptive controller.

The adaptive control device shown in FIG. 1 may be realized as a single calculation device or a plurality of different calculation units for the respective components or groups of components. FIG. 6 shows a processing flow example when the shaking table adaptive control device of FIG. 1 is realized by a single calculation device. Firstly, a white noise W is generated (step 601). This white noise W is used to calculate a mask signal M by Equation (5) for the bandstop filter 13 (step 602). Next, a command signal U and a shaking table response signal Y are read in (steps 603 and 604). According to the command signal U, a modified command signal U' is calculated by Equation (1) for the adaptive filter 8 (step 605). This modified command signal U' is used to calculate a desired shaking table response signal Y' by Equation (2) for the reference signal generator 9 (step 606). This desired shaking table response signal Y' is used to calculate a signal Ro by Equation (3) for the bandpass filter 11A. Next, by Equation (6), a mask signal M is added to the signal $R_0$ so as to calculate a reference signal R (step 607). On the other hand, an actual shaking table response signal Y which has been read in earlier is used to calculate the signal $V_0$ by Equation (4) for the bandpass filter 11B. Furthermore, using Equation (7), the mask signal M is added to the signal $V_0$ so as to calculate a derived signal V (step 608). Next, using the reference signal R and the derived signal V, the fluctuation of the shaking table transfer characteristics caused by the specimen is identified by an identification processing such as the recursive least square method (step 609) and the control coefficients of the adaptive filter to compensate this fluctuation are calculated by Equation (9) (step 610). The control coefficients calculated are utilized in the next calculation in step 605 for the adaptive filter. The aforementioned calculations are repeatedly performed so as to identify and compensate the fluctuation of the shaking table transfer characteristics caused by the specimen in real time.

It should be noted that the sequence of processes is not to be limited to the aforementioned but may be in a different order if equivalent processing can be performed including a parallel processing. Moreover, when the calculation speed of the controller is insufficient, it is possible to skip some cycles of the identification calculations in the identification unit 5.

As has been described above, by the effect of the bandpass filters 11A, 11B and the mask signal M, it is possible to extract a difference between the desired and the actual shaking table transfer characteristics appearing in the pass band of the bandpass filters. Therefore it is also possible to suppress the difference between the desired and the actual shaking table transfer characteristics appearing in the pass band of the bandstop filter 13 and the effect of the noise contained in the shaking table response signal Y. This enables to compensate the transfer characteristics of the shaking table in a desired frequency band and to make the characteristics of the adaptive filter stable. Furthermore, it becomes possible to identify with an identification model of a lower order, therefore to reduce the time required for the identification calculation.

It should be noted that while explanation has been given on a case when the present invention is applied to the adaptive control device of the shaking table, the adaptive control device of the present invention is not to be limited to the control of the shaking table but the device may be applied to various objects by modifying the configuration.

The adaptive control device according to the present invention enables to surely compensate the transfer characteristics of the shaking table in a desired frequency band and to make the characteristics of the adaptive filter stable. Furthermore, the present invention enables to identify with an identification model of a lower order, therefore to reduce the time required for the identification calculation.

What is claimed is:
1. A shaking table comprising:
   a table for mounting a specimen;
   actuators for exciting the table;
   a feedback controller for generating a drive signal for the actuators so that an inputted second command signal is agreed with a response signal indicating a vibration state of the table having the same dimension as this second command signal;

an adaptive filter having variable filter coefficients which is supplied with an external first command signal indicating a target value of the response signal and generates the second command signal so as to compensate the transfer characteristic from the feedback controller to the table loading the specimen;

a mask signal generator for generating a mask signal having no frequency component in the frequency band compensated by the adaptive filter;

a first adder for adding the mask signal to the second command signal;

a second adder for adding the mask signal to the response signal; and an identification unit which is supplied with the outputs of the first and the second adders, calculates the filter coefficients of the adaptive filter to compensate the transfer characteristics, and supplies the calculated coefficients to the adaptive filter.

2. The shaking table as claimed in claim 1, the table further comprising a first and a second bandpass filters having the same characteristics whose pass band is equal to the frequency band compensated by the adaptive filter, wherein the second command signal is filtered by the first bandpass filter and then added to the mask signal by the first adder, while the response signal is filtered by the second bandpass filter and then added to the mask signal by the second adder.

3. The shaking table a claimed in claim 2, wherein the mask signal generator includes a white noise generator and a bandstop filter for preventing the frequency band compensated by the adaptive filter.

4. The shaking table a claimed in claim 1, wherein the mask signal generator includes a white noise generator and a bandstop filter for preventing the frequency band compensated by the adaptive filter.

5. A shaking table comprising:

a table for mounting a specimen;

actuators for exciting the table;

a feedback controller for generating a drive signal for the actuators so that an inputted second command signal is agreed with a response signal indicating a vibration state of the table having the same dimension as this second command signal;

an adaptive filter having variable filter coefficients which is supplied with an external first command signal indicating a target value of the response signal and generates the second command signal so as to compensate the transfer characteristics from the feedback controller to the table loading the specimen;

a mask signal generator for generating a mask signal having no frequency component in the frequency band compensated by the adaptive filter;

a reference signal generator which is supplied with the second command signal and calculates the target value of the response signal using a desired transfer characteristics or a transfer characteristics of a predetermined non-load state;

a first adder for adding the mask signal to the output signal from the reference signal generator;

a second adder for adding the mask signal to the response signal; and an identification unit which is supplied with the outputs of the first and the second adders, for calculating the filter coefficients of the adaptive filter to compensate the transfer characteristics, and supplying the calculated coefficients to the adaptive filter.

6. The shaking table as claimed in claim 5, the table further comprising a first and a second bandpass filters having the same characteristics whose pass band is equal to the frequency band compensated by the adaptive filter, wherein the reference signal generator output is filtered by the first bandpass filter and then added to the mask signal by the first adder, while the response signal is filtered by the second bandpass filter and then added to the mask signal by the second adder.

7. The shaking table a claimed in claim 6, wherein the mask signal generator includes a white noise generator and a bandstop filter for preventing the frequency band compensated by the adaptive filter.

8. The shaking table a claimed in claim 5, wherein the mask signal generator includes a white noise generator and a bandstop filter for preventing the frequency band compensated by the adaptive filter.

9. An adaptive control device for controlling so that one of control state variables of a process to be controlled are agreed with a target signal, the device comprising:

an adaptive filter having variable filter coefficients which is supplied with the target signal and generates the control input signal, so as to compensate the transfer characteristics from the control input signal to the control state variable of the process to be controlled;

a signal generator for generating a mask signal having no frequency component in the frequency band compensated by the adaptive filter;

a first bandpass filter whose pass band is the frequency band compensated by the adaptive filter and which is supplied with the control input signal;

a first adder for adding the mask signal to the output from the first bandpass filter;

a second bandpass filter having the same characteristics as the first bandpass filter and supplied with a control state variable measured by a measurement unit;

a second adder for adding the mask signal to the output from the second bandpass filter; and an identification unit supplied with the outputs of the first and the second adders, for calculating filter coefficients of the adaptive filter for compensating the transfer characteristics, and supplying the calculated coefficients to the adaptive filter.

* * * * *